United States Patent [19]

Elliott

[11] Patent Number: 5,065,734
[45] Date of Patent: Nov. 19, 1991

[54] PORTABLE CONVERTIBLE BARBEQUE GRILL

[76] Inventor: Bernard Elliott, 4146 Edgemere Ct., Apt. D-3, Indianapolis, Ind. 46205

[21] Appl. No.: 628,144

[22] Filed: Dec. 17, 1990

[51] Int. Cl.⁵ .............................................. F24C 1/16
[52] U.S. Cl. .................................. 126/9 R; 126/25 R
[58] Field of Search ............................. 126/9 R, 25 R

[56] References Cited

U.S. PATENT DOCUMENTS

| | | |
|---|---|---|
| 2,786,463 | 3/1957 | Vincent . |
| 2,842,044 | 7/1958 | Kirk ................................... 126/9 R |
| 3,828,759 | 8/1974 | Cooper .............................. 126/9 R |
| 4,090,490 | 5/1978 | Riley et al. . |
| 4,453,529 | 6/1984 | Spencer et al. . |
| 4,492,215 | 1/1985 | Digianvittorio . |
| 4,616,624 | 10/1986 | Parker . |
| 4,741,321 | 5/1988 | Squires . |
| 4,878,476 | 11/1989 | Oliphant . |

*Primary Examiner*—Carroll B. Dority
*Attorney, Agent, or Firm*—Craig A. Wood

[57] ABSTRACT

A portable grill is disclosed for cooking outdoors with charcoal, and cooking indoors on a stove or in an oven. A cooking rack is disposed within a bottom pan having a generally flattened bottom, and a top plan is removably placed over the bottom pan. The bottom pan may be support by placement on a foldable stand.

20 Claims, 4 Drawing Sheets

PORTABLE CONVERTIBLE BARBEQUE GRILL

BACKGROUND OF THE INVENTION

1. Field of the Invention

The popularity of outdoor cooking increases each year, especially with respect to those cooking devices that are portable and easy to use. The present invention generally relates to portable cookers or grills, and more particularly concerns a portable grill that may be used outdoors utilizing charcoal briquettes, and in addition may be used indoors on a stove top or by placement in an oven.

2. Description of the Prior Art

A number of portable grills for outdoor use with charcoal briquettes or gas are available, for instance, those devices disclosed by U.S. Pat. Nos. 2,786,463; 4,090,490; 4,453,529; 4,492,215; 4,616,624; 4,741,321 and 4,878,476. The devices recently becoming available have tended to have a large number of components, thereby increasing cost, weight, cleaning time and difficulty of use.

Despite the availability of such devices, there exists a need in the art for a lightweight, inexpensive and easy to use portable convertible barbeque grill that is capable of use outdoors yet is also capable of indoor use on a stove top or in an oven.

SUMMARY OF THE INVENTION

In order to aid in the understanding of the present invention, it can be stated in essentially summary form that it is directed to a portable convertible barbeque grill that is capable of use outdoors with charcoal briquettes and indoors on a stove top or in an oven.

It is an object of the present invention to provide a portable convertible barbeque grill that is capable of outdoor use, with heating provided by charcoal briquettes.

It is another object of the present invention to provide a portable convertible barbeque grill that is capable of indoor use on a conventional stove top, with heating provided by the electric or gas elements of the stove top.

It is another object of the present invention to provide a portable convertible barbeque grill that is capable of indoor use in a conventional oven, with heating provided by the electric or gas elements of the oven.

It is another object of the present invention to provide a portable convertible barbeque grill that is lightweight yet sturdy.

It is another object of the present invention to provide a portable convertible barbeque grill that is capable of preparing foods outdoors by grilling, steaming and warming.

It is another object of the present invention to provide a portable convertible barbeque grill that is capable of preparing foods indoors by grilling, roasting, steaming and warming.

It is still another object of the present invention to provide a portable convertible barbeque grill that is inexpensive to produce.

It is yet another object of the present invention to provide a portable convertible barbeque grill of relatively simple construction with a minimum of components, permitting easy assembly, disassembly, transportation and cleaning.

Further objects and advantages of the present invention will be apparent from a study of the following portion of the specification, the claims, and the attached drawings.

DESCRIPTION OF THE PREFERRED EMBODIMENT

Figure 1:
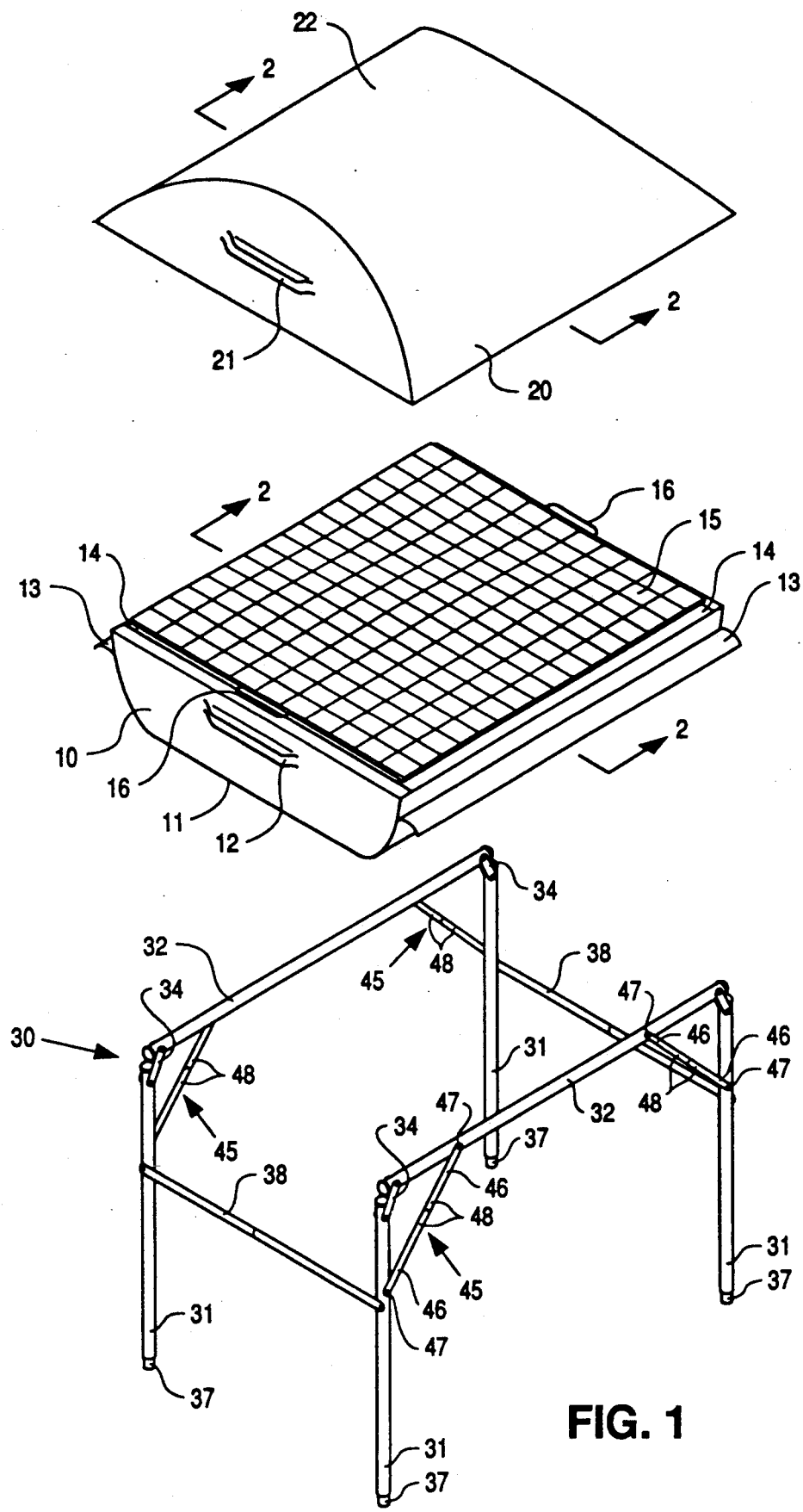
FIG. 1 is a perspective exploded view of a portable convertible barbeque grill representing the present invention.

The following portion of the specification, taken in conjunction with the drawing, sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 2:
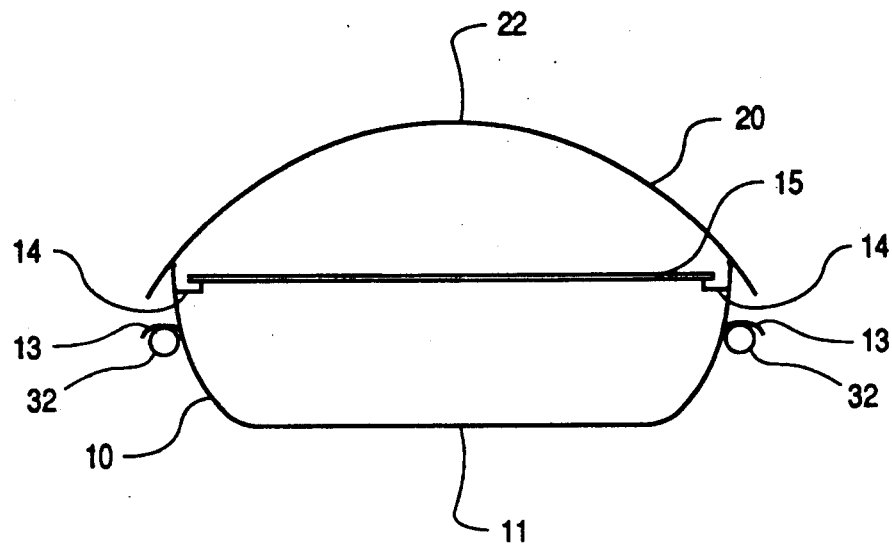
FIG. 2 is a fragmentary section view taken along line 2—2 of FIG. 1.

Referring now to the drawings for a detailed description of the present invention, reference is first made to FIGS. 1 and 2, showing generally rectangular pan 10 having flattened bottom 11, integral pan handles 12 disposed along the shorter sides of pan 10, downwardly concave integral exterior lips 13 disposed along the longer sides of pan 10, and integral interior lips 14 disposed along the longer sides of pan 10. Cooking rack 15, having cooking rack handles 16, is disposed to fit within pan 10 and removably rests on interior lips 14. Generally rectangular cover 20, having integral cover handles 21 and rounded top 22, is slightly larger in inside dimensions than the comparable outside dimensions of pan 10, so that cover 20 may be disposed to removably fit over pan 10 thereby forming a closed volume. The overall exterior dimensions of pan 10 and cover 20 are selected so that pan 10 with cover 20 in place is capable of placement within an oven or upon a stove top, as hereinafter described.

Figure 4:
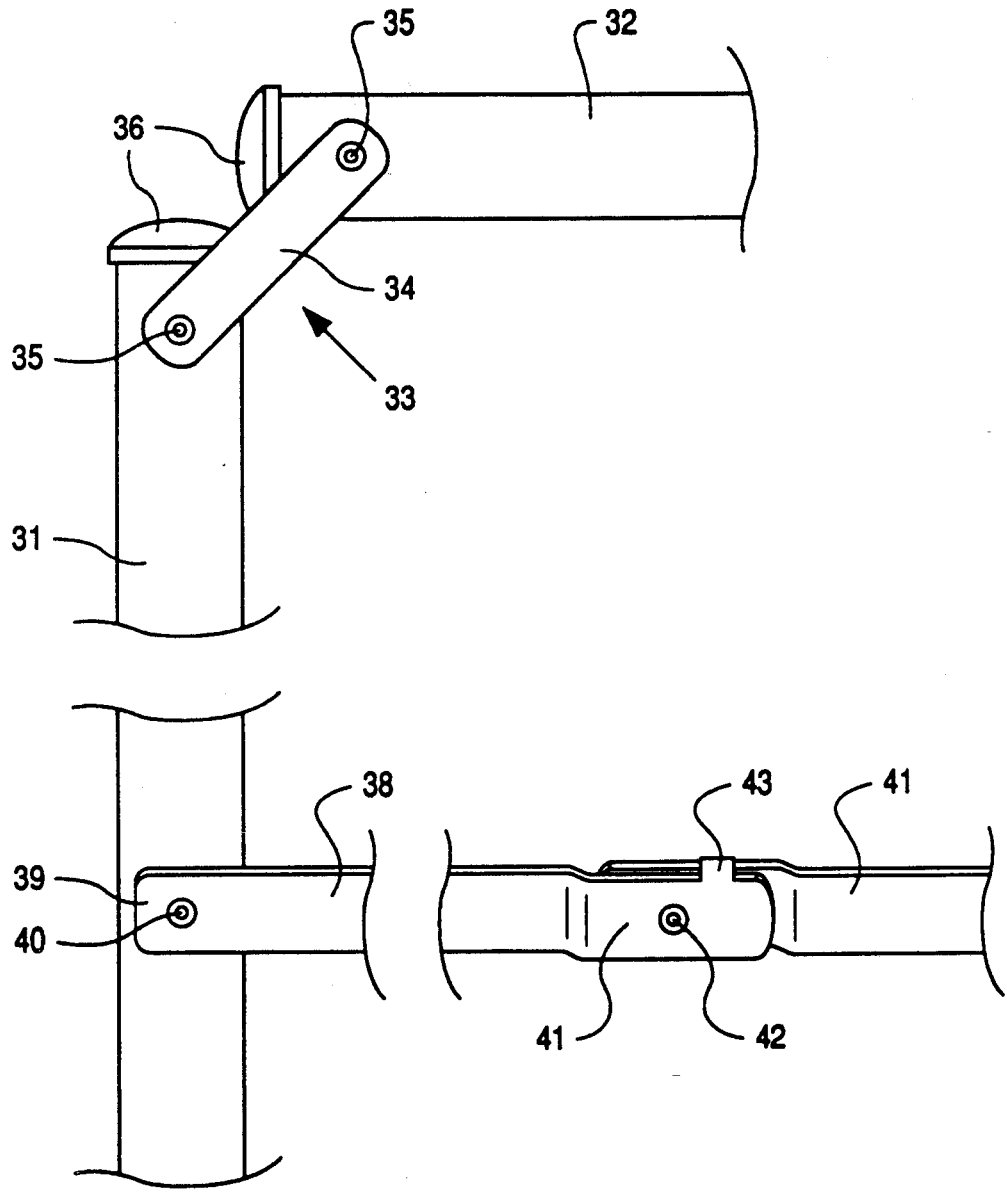
FIG. 4 is an enlarged, fragmentary view of corner hinge 33 and cross hinge 38.

As depicted in FIGS. 1 and 4, stand 30 has legs 31 foldably connected to horizontal members 32 by corner hinges 33. Each corner hinge 33 has two hinge plates 34 rotatably attached on one end to a leg 31 and on the other end to a horizontal member 32 by way of support rivets 35. Caps 36 are disposed at the ends of horizontal members 32 and at the end of legs 31. Feet 37 are disposed at the lower end of legs 31 Two-piece cross hinges 38 are similar to a type commonly used on card tables and similar, and are disposed between adjacent pairs of legs 31 unconnected by a horizontal member 32. Each cross hinge 38 is rotatably attached on cross hinge exterior ends 39 to legs 31 by cross hinge rivets 40. The two pieces of each cross hinge 38 are rotatably attached on cross hinge offset interior ends 41 by a cross hinge rivet 42. A cross hinge tab 43 prevents movement of the pieces of each cross hinge 38 beyond the horizontal, and a detent, not shown, between cross hinge interior ends 41 provides a locking action for each cross hinge 33. In order to increase stability, legs 31 are slightly inclined to the vertical in the plane of legs 31 and cross hinges 38. Two piece diagonal hinges 45 are disposed between legs 31 and the adjacent horizontal member 32, and are rotatably attached on diagonal hinge exterior ends 46 to legs 31 and horizontal members 32 by diagonal hinge rivets rivets 47. In a manner entirely similar to cross hinges 36, the two pieces of each diagonal hinge 45 are rotatably attached on diagonal hinge offset interior ends 48 by a diagonal hinge rivet, not shown, and utilize a diagonal hinge tab, not shown, and a diagonal hinge detent, not shown.

Figure 3:
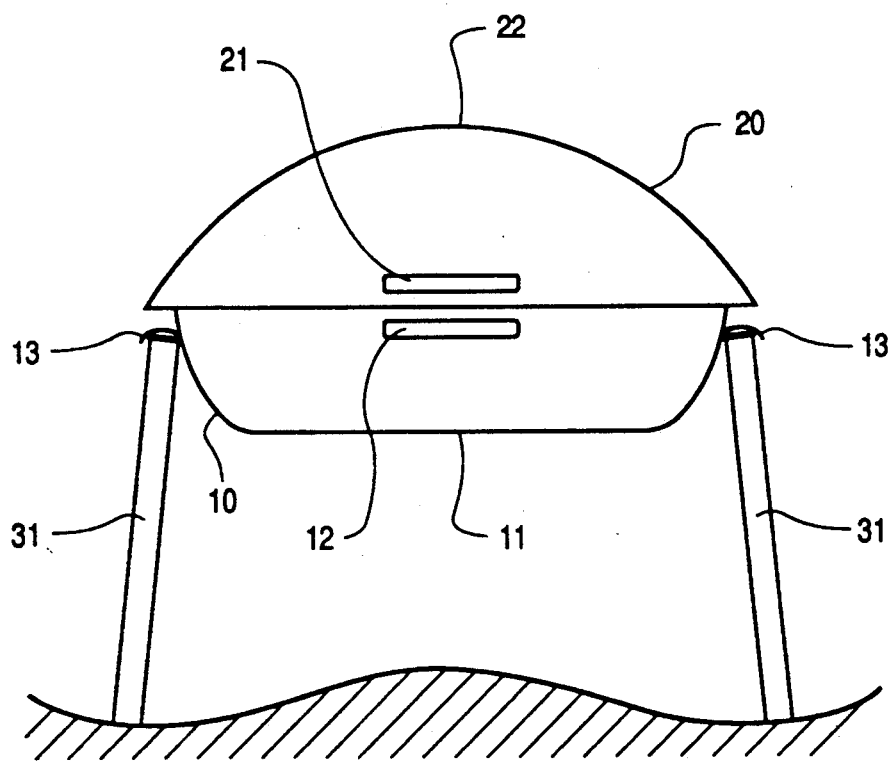
FIG. 3 is a fragmentary end elevational view.

Referring to FIGS. 1, 2 and 3, pan 10 may be supported on stand 30 by disposing exterior lips 13 along horizontal members 32.

Figure 5:
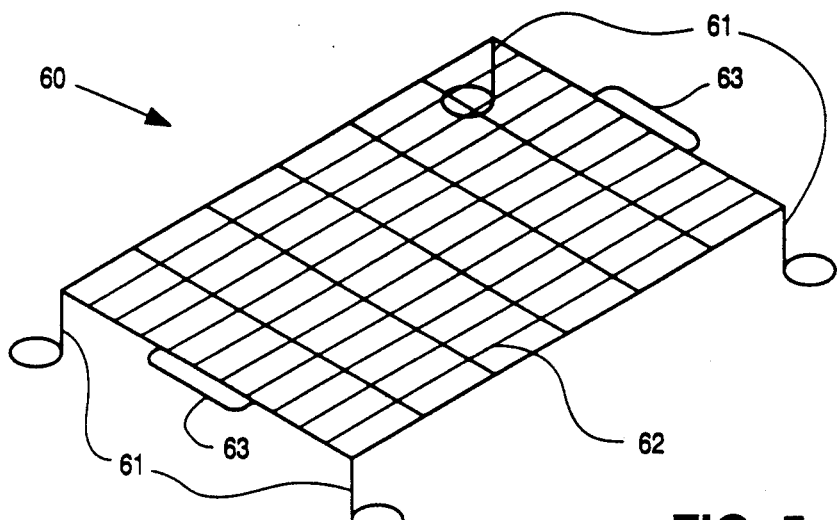
FIG. 5 is a perspective view of insert 60.

FIG. 5 depicts generally rectangular insert 60, having feet 61, insert grill 62, and handles 63 disposed along the shorter sides of insert 60. The dimensions of insert 60 are chosen so that insert 60 may be disposed within pan 10 with feet 61 resting on the interior surface of bottom 11 and with insert grill 62 above the interior surface of bottom 11.

Figure 6:
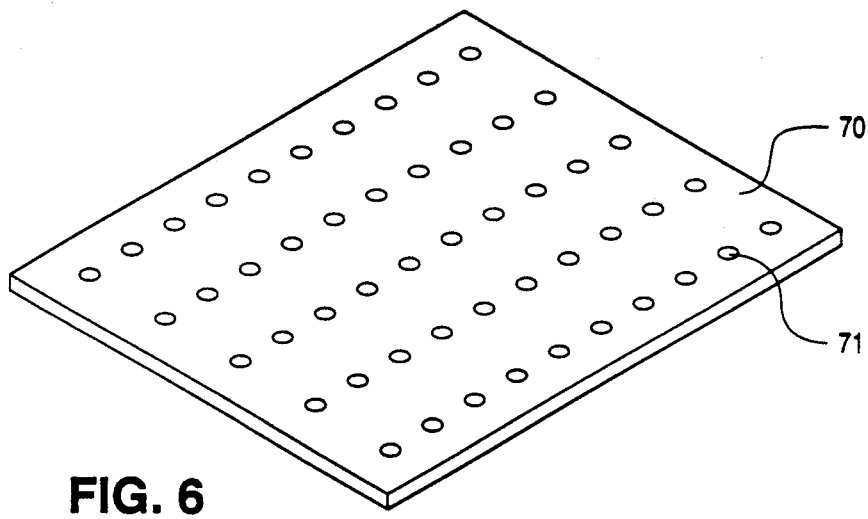
FIG. 6 is a perspective view of steamer 70.

FIG. 6 depicts generally rectangular steamer plate 70, having a plurality of holes 71. The dimensions of steamer 70 are chosen so that steamer 70 may be disposed within pan 10 by resting on interior lips 14.

Figure 7:
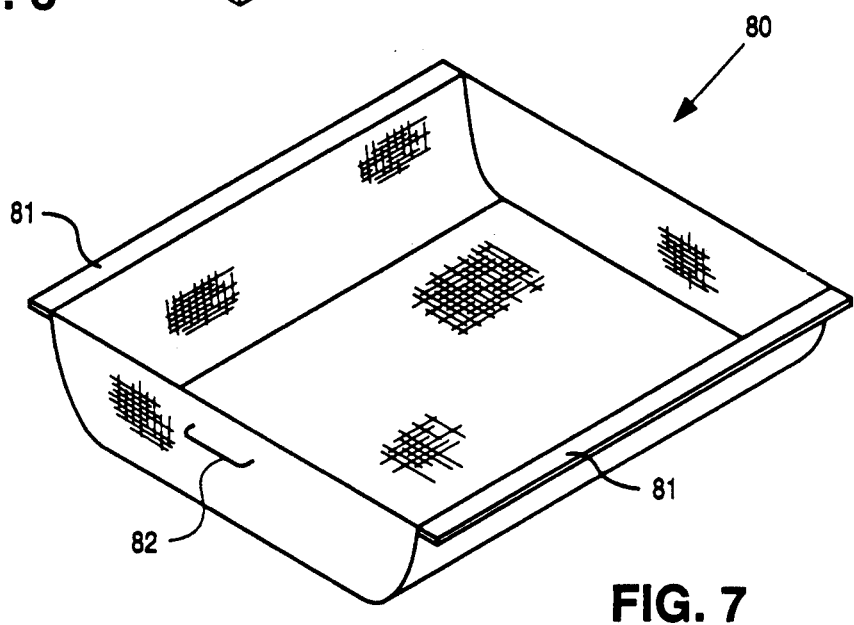
FIG. 7 is a perspective view of warmer basket 80.

FIG. 7 depicts generally rectangular warmer basket 80 having ledges 81 disposed along the longer sides of basket 80 and handles 82 disposed along the shorter sides of basket 80. The dimensions of basket 80 are chosen so that warmer 80 may be disposed within pan 10 by support of ledges 81 resting on interior lips 14.

In use outdoors, charcoal briquettes are placed in pan 10 below cooking rack 15 and used as a heat source in the conventional manner. The air necessary to maintain combustion is provided by periodic removal of cover 20 as the user determines the status of the cooking process. In those instances where it is not necessary to periodically determine the cooking status such as with the slow cooking of a large roast or turkey, sufficient air may be provided by placing cover 20 on pan 10 so as to provide a small gap or opening between pan 10 and cover 20. In a similar manner, steamer 70 and basket 80 may be used outdoors, thereby providing a method to steam vegatables and the like, and to warm previously cooked foods, bread products and similar. These outdoor uses of the present invention may occur with the use of stand 30 so that pan 10 is placed at a convenient height for use in the standing position. In addition, circumstances may be favorable for using the present invention outdoors without stand 30. In such a case, flattened bottom 11 of pan 10 may be placed in contact with level ground, concrete, asphalt or similar heat resistant surface. Before and after use, the present invention may be easily transported and stored by lifting pan 10 and cover 20 as a unit from stand 30, and by folding stand 30 to an easily transportable configuration.

In use indoors, the present invention may be used by placing pan 10 with cover 20 inside an oven on a rack provided therein, utilizing cooking rack 15, insert 60, steamer 70 or warmer basket 80 as desired. In a similar manner, the present invention may be used on a stove top, with flattened bottom 11 in contact with the electric or gas elements of the stove.

The dimensions of the present invention are chosen so as to have sufficient volume to allow the preparation of a wide variety of foods, yet small enough to allow use inside a conventional oven or on a stove top, and permit easy transportation, for instance in the trunk of an automobile.

Pan 10 and cover 20 of the present invention may be constructed of a durable material such as stainless steel, Pyrex or Lexsan that permits integral formation of pan handles 12, exterior lips 13 and interior lips 14 with pan 10, and cover handles 21 with cover 20.

The present invention having been described in its preferred embodiment, it is clear that it is susceptible to numerous modifications and embodiments within the ability of those skilled in the art and without the exercise of the inventive faculty. Accordingly, the scope of the present invention is defined by the scope of the following claims.

What is claimed is:

1. Portable convertible barbeque grill, comprising:
   a foldable stand having two oppositely disposed parallel horizontal members;
   a generally rectangular pan having a flattened bottom, at least two integral pan handles, each disposed along the exterior of a shorter wall of said pan, two horizontal parallel integral interior lips, each disposed longitudinally along the interior of a longer wall of said pan, and two horizontal parallel integral exterior lips, each disposed longitudinally along the exterior of a longer wall of said pan so that said exterior lips are capable of removably resting on said horizontal members so as to provide support to said pan;
   a generally rectangular cover having at least two integral cover handles, each disposed along the exterior of a shorter wall of said cover, said cover having interior dimensions slightly larger than the exterior dimensions of said pan so that said cover may be disposed to removably fit over said pan; and
   food support means, having dimensions slightly smaller than the interior dimensions of said pan so that said food support means is capable of removably resting on said interior lips.

2. Portable convertible barbeque grill as defined in claim 1, wherein said pan and said cover are fabricated of stainless steel.

3. Portable convertible barbeque grill as defined in claim 1, wherein said pan and said cover are fabricated of Pyrex.

4. Portable convertible barbeque grill as defined in claim 1, wherein said pan and said cover are fabricated of Lexsan.

5. Portable convertible barbeque grill as defined in claim 1, wherein said food support means comprises a planar, generally rectangular cooking rack having at least two cooking rack handles, each attached to a shorter side of said cooking rack.

6. Portable convertible barbeque grill as defined in claim 5, wherein said pan and said cover are fabricated of stainless steel.

7. Portable convertible barbeque grill as defined in claim 5, wherein said pan and said cover are fabricated of Pyrex.

8. Portable convertible barbeque grill as defined in claim 5, wherein said pan and said cover are fabricated of Lexsan.

9. Portable convertible barbeque grill as defined in claim 1, wherein said food support means comprises a generally rectangular plate having a plurality of holes.

10. Portable convertible barbeque grill as defined in claim 9, wherein said pan and said cover are fabricated of stainless steel.

11. Portable convertible barbeque grill as defined in claim 9, wherein said pan and said cover are fabricated of Pyrex.

12. Portable convertible barbeque grill as defined in claim 9, wherein said pan and said cover are fabricated of Lexsan.

13. Portable convertible barbeque grill as defined in claim 1, wherein said food support means comprises a generally rectangular warmer basket having at least two basket handles each attached along a shorter side of said basket, and having two ledges, each attached along a longer side of said basket so that said ledges are capable of removably resting on said interior lips.

14. Portable convertible barbeque grill as defined in claim 13, wherein said pan and said cover are fabricated of stainless steel.

15. Portable convertible barbeque grill as defined in claim 13, wherein said pan and said cover are fabricated of Pyrex.

16. Portable convertible barbeque grill as defined in claim 13, wherein said pan and said cover are fabricated of Lexsan.

17. Portable convertible barbeque grill, comprising:
- a foldable stand having two oppositely disposed parallel horizontal members;
- a generally rectangular pan having a flattened bottom, at least two integral pan handles, each disposed along the exterior of a shorter wall of said pan, and two horizontal parallel integral exterior lips, each disposed longitudinally along the exterior of a longer wall of said pan so that said exterior lips are capable of removably resting on said horizontal members so as to provide support to said pan;
- a generally rectangular cover having at least two integral cover handles, each disposed along the exterior of a shorter wall of said cover, said cover having interior dimensions slightly larger than the exterior dimensions of said pan so that said cover may be disposed to removably fit over said pan;
- a generally rectangular planar insert rack having dimensions slightly smaller than the interior dimensions of said pan;
- at least two insert handles, each attached to a shorter side of said insert rack; and
- at least four feet, each attached to the bottom of said insert rack so that said insert rack is capable of removably resting on the interior surface of the bottom of sad pan with said insert rack disposed above the interior of the bottom of said pan.

18. Portable convertible barbeque grill as defined in claim 17, wherein said pan and said cover are fabricated of stainless steel.

19. Portable convertible barbeque grill as defined in claim 17, wherein said pan and said cover are fabricated of Pyrex.

20. Portable convertible barbeque grill as defined in claim 17, wherein said pan and said cover are fabricated of Lexsan.

* * * * *